July 4, 1933.   H. E. IVES   1,916,320
STEREOSCOPIC PICTURE WITH EXAGGERATED OR DIMINISHED RELIEF
Filed Aug. 12, 1931   2 Sheets-Sheet 1

INVENTOR
H. E. IVES
BY
ATTORNEY

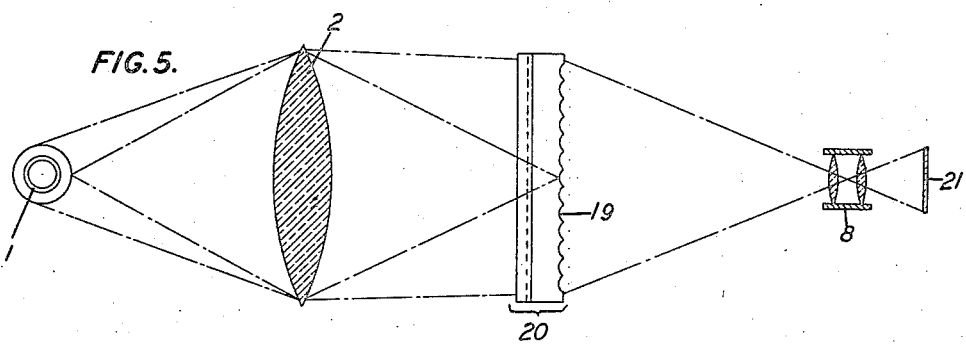
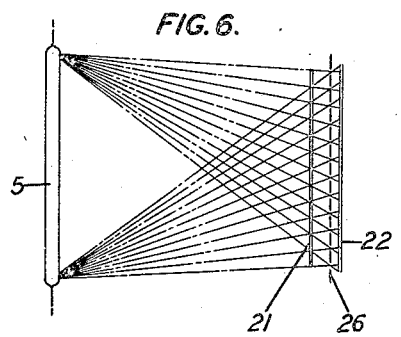
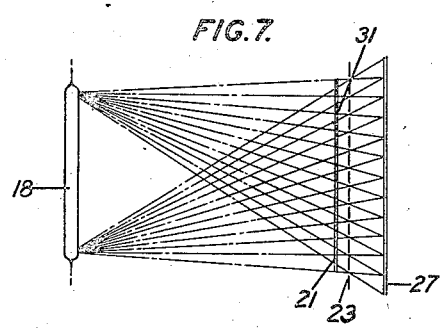
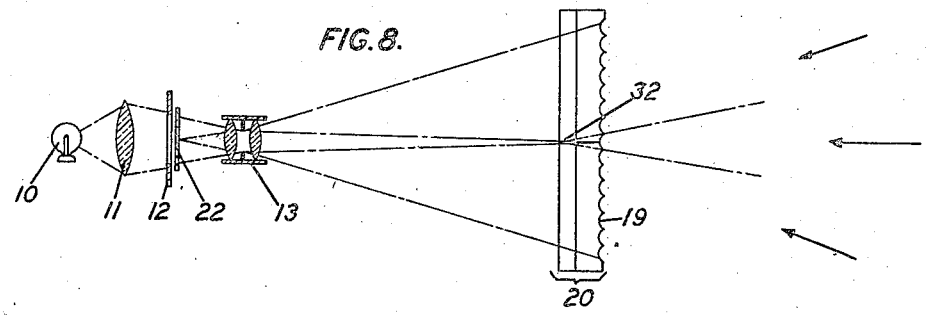
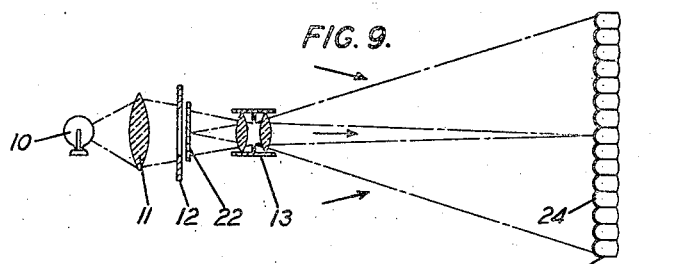

Patented July 4, 1933

1,916,320

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

STEREOSCOPIC PICTURE WITH EXAGGERATED OR DIMINISHED RELIEF

Application filed August 12, 1931. Serial No. 556,492.

This invention relates to the producing of pictures in stereoscopic relief and more particularly to the producing of pictures in either exaggerated or diminished relief.

An object of the invention is to provide a novel overall system for presenting pictures with a changed degree of relief. The change may result in either exaggerated or diminished stereoscopic relief.

Another object of the invention is to provide an arrangement for producing by shadow printing parallax panoramagrams of one type from parallax panoramagrams of the opposite type with a changed degree of relief.

The invention is applicable to both still and motion pictures.

A feature of the invention is a complete system for presenting projected pictures in either exaggerated or diminished stereoscopic relief starting with either a stereoscopic or a pseudoscopic parallax panoramagram.

In one arrangement illustrative of the invention, a pseudoscopic parallax panoramagram negative is produced by means of a large lens or mirror in conjunction with an opaque line grating or similar means. This pseudoscopic parallax panoramagram negative is then used to make a stereoscopic parallax panoramagram positive in either exaggerated or diminished relief by shadow printing. This positive is then projected upon a light diffusing viewing screen to produce pictures visible in either exaggerated or diminished stereoscopic relief, the type of relief depending upon the manner in which the pseudoscopic parallax panoramagram negative was shadow printed. A method of producing pseudoscopic parallax panoramagrams using a large lens is disclosed in a paper entitled "Parallax Panoramagrams Made with a Large Lens" by H. E. Ives, published in the June 1930 issue of the Journal of the Optical Society of America. Another method for producing pseudoscopic parallax panoramagrams using a large mirror is disclosed in a paper by the same author entitled "Parallax Panoramagrams Made with a Large Concave Mirror" published in the November 1930 issue of the Journal of the Optical Society of America.

In an alternative arrangement which is also illustrative of this invention a stereoscopic parallax panoramagram negative is produced by means of a large lens or mirror in conjunction with a lenticular grating having concave cylindrical grooves corresponding to vertical elemental strips of the object. This part of the arrangement is disclosed in a copending application of H. E. Ives, Serial No. 518,334, filed February 26, 1931. This stereoscopic parallax panoramagram negative is shadow printed to make a pseudoscopic parallax panoramagram positive in either exaggerated or diminished relief. This pseudoscopic parallax panoramagram positive is then projected upon a virtual image type of screen to produce pictures visible in either exaggerated or diminished relief, the type of relief depending upon the manner in which the parallax panoramagram positive is shadow printed. The virtual image type of viewing screen used in this arrangement is disclosed in a copending application of H. E. Ives, Serial No. 515,659, filed February 14, 1931.

The shadow printing apparatus used for producing one type of parallax panoramagram in either exaggerated or diminished relief from the opposite type of parallax panoramagram comprises a line source of light, an opaque line grating, and a light sensitive plate. The parallax panoramagram negative which may be either of the stereoscopic or of the pseudoscopic type is exposed to the line source of light positioned at right angles to the direction of the panoramic strips of the negative. The sensitive plate is placed behind the negative and interposed between the two is an opaque line grating of the type disclosed in the two Ives publications supra. The line source of light is of such length that a panoramic strip is shadowed through the grating on to the sensitive plate.

The degree of relief obtained in the parallax panoramagram which is formed upon the sensitive plate by this shadow printing process is dependent upon the relative size of each of the panoramic strips with respect to the size of the entire parallax panoramagram printed, as compared with the relative size of each of the corresponding panoramic strips of the original with respect to its entire parallax panoramagram. In other words if each of the panoramic strips of the parallax panoramagram formed on the sensitive plate constitutes a materially smaller percentage of its entire panoramagram than does the corresponding panoramic strip of the original panoramagram with respect to its entire panoramagram then the parallax panoramagram produced upon the sensitive plate will, upon viewing, be seen through a smaller angle and thereby give exaggerated relief. Since the panoramic strips are compressed to occupy a smaller area on the light sensitive plate than originally occupied on the parallax panoramagram negative there will be blank or dark spaces formed between each pair of the panoramic strips formed on the sensitive plate. The converse of this case holds for diminished relief wherein each of the panoramic strips of the parallax panoramagram formed on the sensitive plate is spread out and occupies a larger percentage of the entire panoramagram than is occupied by the correcponding portion of the corresponding strip of the original with respect to its entire panoramagram. This permits the printed parallax panoramagram to be seen through a larger angle and thereby gives diminished relief.

The line source of light, the parallax panoramagram, the opaque line grating and the sensitive plate used in the above methods are arranged in a manner to produce the desired degree of relief. One way of producing exaggerated relief is to make the distance between the opaque line grating and the sensitive plate less than it would be to give normal relief. Diminished relief is produced by interchanging these relative distances. With this arrangement the entire parallax panoramagram negative is not projected; that is, there are blank spaces left between each pair of panoramic strips on the negative which are not projected. This is due to the fact that the panoramic strips projected on to the sensitive plate are much larger than the corresponding strips of the negative and if all of the strips of the negative were projected the enlarged strips on the light sensitive plate would overlap.

A modification of the above arrangements for shadow printing to produce either exaggerated or diminished relief is applicable where it is desired to produce a parallax panoramagram in reduced size, such as lantern slide or motion picture frame size, suitable for projection and viewing on a rod screen. In this modification, the light sensitive plate of the above arrangements is replaced by a fine translucent diffusing glass sheet on which the shadow image is formed. This image is then photographed, by means of a high quality short focus photographic lens, upon a light sensitive emulsion carrier in any desired size, such as lantern slide or motion picture frame size.

The shadow printed parallax panoramagram positive is projected upon a viewing screen whose angle of observation is the same as the viewing angle of the large lens or mirror through which the parallax panoramagram negative was made. A suitable type of viewing screen is used so that the pictures which are viewed are always seen in stereoscopic relief whether the parallax panoramagram positive being projected is of the stereoscopic or the pseudoscopic type.

The invention will now be described more in detail having reference to the accompanying drawings:

Fig. 5 is a diagrammatic showing of an arrangement for producing in reduced size a stereoscopic parallax panoramagram using a large lens and a concave grooved lenticular grating;

Fig. 6 is a diagrammatic showing of an arrangement for shadow printing one type of parallax panoramagram of reduced size to produce the opposite type of parallax panoramagram of reduced size in exaggerated relief;

Fig. 7 is a diagrammatic showing of an arrangement for shadow printing one type of parallax panoramagram of reduced size to produce the opposite type of parallax panoramagram of reduced size in diminished relief.

Fig. 8 is a diagrammatic showing of an arrangement for projecting pseudoscopic parallax panoramagrams of either exaggerated or diminished relief for viewing in either exaggerated or diminished stereoscopic relief using a grooved transmitting viewing screen;

Fig. 9 is a diagrammatic showing of an arrangement for projecting pseudoscopic parallax panoramagrams of either exaggerated or diminished relief for viewing in either exaggerated or diminished stereoscopic relief using a convex ridged reflecting viewing screen.

Figure 1:
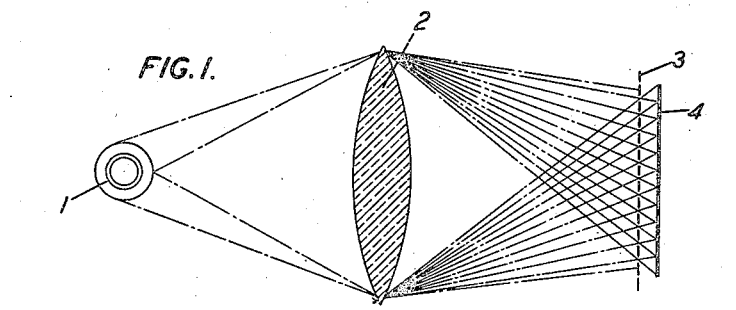
Fig. 1 is a diagrammatic showing of an arrangement for producing pseudoscopic parallax panoramagrams with a large lens and opaque line grating.

Referring now to Fig. 1, a large diameter lens 2 is positioned to image an object 1 through a wide angle of view. This image is projected through the transparent spacings of an opaque line grating 3 and received on a light sensitive film 4. The image formed on film 4 is divided into a plurality of strip images due to the structure of the opaque line grating 3. This method of photographing with a large lens to produce this type of image, which is a pseudoscopic parallax panoramagram, is described in the Ives publication supra.

Figure 2:
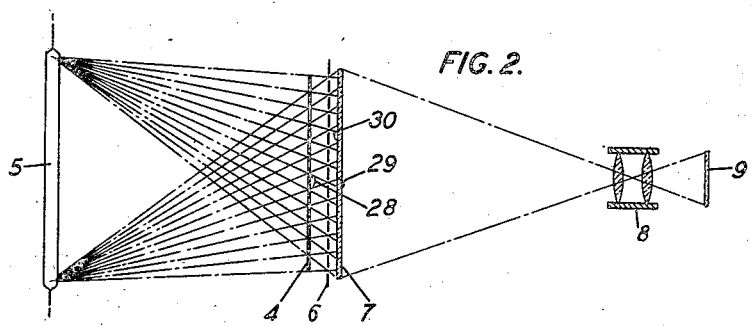
Fig. 2 is a diagrammatic showing of an arrangement for shadow printing one type of parallax panoramagram to produce the opposite type of parallax panoramagram in exaggerated relief.

The pseudoscopic parallax panoramagram film 4 produced in Fig. 1 is shadow printed with the apparatus shown in Fig. 2 to produce in motion picture frame size a stereoscopic parallax panoramagram having exaggerated relief.

Referring now to Fig. 2 a line source of light 5 is positioned at a suitable distance from the pseudoscopic parallax panoramagram film 4 behind which is placed an opaque line grating 6 and a ground glass plate 7. The grating 6 is positioned nearer to the plate 7 than to the film 4. The line of light 5 projects the panoramic strips of the film 4 through the transparent spaces of the opaque line grating 6 upon the ground glass plate 7. By making the distance from the grating 6 to the film 4 greater than from the grating 6 to the plate 7, the panoramic strips projected from the film 4 are compressed and each strip occupies a much smaller area on the plate 7 than is occupied by the corresponding strip on the film 4. The relative sizes of the panoramic strips before and after projection are shown by the areas 28 and 29, respectively. Area 29 constitutes a much smaller percentage of the entire panoramagram printed on the plate 7, than area 28 does with respect to the entire panoramagram on the film 4. It is also seen that, due to the decrease in size of the panoramic strips, blank spaces 30 are left between adjacent strips printed on the plate 7. This shadow projection printing process also inverts the panoramic strips of the pseudoscopic parallex panoramagram film 4, left for right, so that the image produced on the plate 7 is a stereoscopic instead of a pseudoscopic parallax panoramagram. The entire image produced on the plate 7 will upon subsequent projection be viewed through a much smaller angle, thereby giving exaggerated relief. A small short focus photographic lens 8 is positioned to photograph the exaggerated relief stereoscopic parallax panoramagram image formed on the plate 7, upon the light sensitive photographic film 9. The lens 8 forms a reduced size image, such as motion picture frame size or lantern slide size, upon the film 9.

Figure 3:
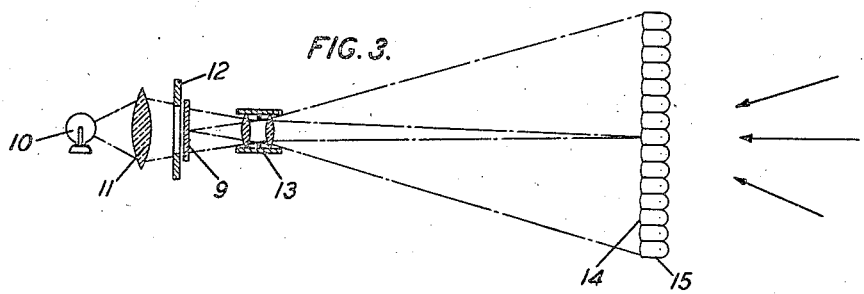
Fig. 3 is a diagrammatic showing of an arrangement for projecting a stereoscopic parallax panoramagram for viewing in stereoscopic relief.

The next step is to project the image formed on the film 9 upon a suitable screen for viewing the pictures in stereoscopic relief; this is carried out by the apparatus shown in Fig. 3.

Referring now to Fig. 3, a picture projector comprising a light source 10, a lens 11, a diaphragm 12 and a small projection lens 13, is employed to project one picture frame at a time of the exaggerated relief stereoscopic parallax panoramagram film 9 upon the rear ridged light diffusing surface 14 of the transmitting lenticular viewing screen 15. A suitable type of shutter (not shown) is positioned between the lens 11 and the film 9 to control the time of exposure of each frame. During the operation, the incandescent light source 10 illuminates the lens 11 which directs the light to give uniform illumination on the back of one picture frame of the film 9. The diaphragm 12 confines the projected light to the one frame being exposed at that time. The projection lens 13 is of such defining power that it images the panoramic strips of the stereoscopic parallax panoramagram film 9 accurately into coincidence with the rear ridged surface 14 of the screen 15. A suitable screen 15 comprises a transparent refracting medium provided on its front and back faces with opposed cylindrical ridges of such curvature that the front ridges focus parallel rays incident from any direction sharply upon the rear ridged surface. The number of pairs of ridges actually employed is sufficient to make the ridges themselves practically invisible from the distance at which the picture is ordinarily viewed. The rear surface 14 is rendered translucent by treating the surface of the transparent material of which the screen is composed or by covering it with a translucent paint. The screen 15 is of the type disclosed in Patent No. 1,883,290 of H. E. Ives, patented October 18, 1932. The stereoscopic exaggerated relief parallax panoramagrams projected on the surface 14 are viewed as stereoscopic pictures in exaggerated relief from the front of the screen 15 in the direction indicated by the arrows. The radii of curvature and the area of each of the lenticular elements comprising the screen 15 are such that the viewing angle of the picture projected in stereoscopic relief is the same as the viewing angle of the large lens 2 in Fig. 1 which originally photographed the object now being viewed on the screen 15.

Figure 4:
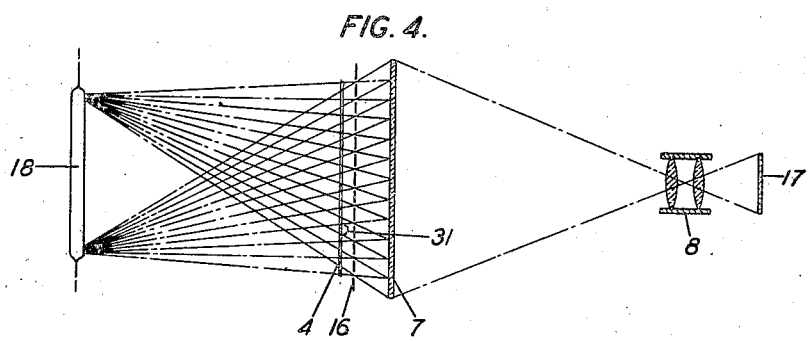
Fig. 4 is a diagrammatic showing of an arrangement for shadow printing one type of parallax panoramagram to produce the opposite type of parallax panoramagram in diminished relief.

For producing parallax panoramagrams in diminished relief, the shadow printing apparatus of Fig. 4 is employed. This arrangement is the converse of the arrangement shown in Fig. 2.

Referring now to Fig. 4, a line source of light 18 is positioned a suitable distance away from the pseudoscopic parallax panoramagram film 4 produced in Fig. 1. Back of the film 4 is placed an opaque line grating 16 and ground glass light diffusing plate 7, the opaque line grating being interposed between the film 4 and the plate 7. The line of light 18 projects portions of the panoramic strips of the film 4 through the transparent spaces of the opaque line grating 16 upon the ground glass plate 7. In this case the opaque line grating 16 is positioned nearer to the film 4 than to the plate 7 so that the panoramic strips of the pseudoscopic parallax panoramagram on the film 4 are printed in increased size upon the diffusing plate 7; that is, the entire panorama is spread out and in a subsequent viewing is seen through a larger angle with a consequent diminished relief. To prevent overlapping of the panoramic strips formed on the plate 7, a portion of each strip of the film 4 is not projected, that is, small blank spaces are left as shown by the small areas 31 on the film 4. In this case also an inversion of the panoramic strips occurs whereby the pseudoscopic parallax panoramagram on the film 4 is used to produce a stereoscopic parallax panoramagram image on the plate 7. The photographic lens 8 acts in the same manner as described for the lens 8 in Fig. 2 and produces on the film 17 a stereoscopic parallax panoramagram in diminished relief.

For viewing the film 17 produced in Fig. 4, the arrangement in Fig. 3 is employed. The operation is the same as described above in connection with projecting the film 9, only in this case the images projected from the film 17 upon the screen 15 will appear from the front of the screen, in the direction indicated by the arrows, as pictures in stereoscopic diminished relief.

An alternative method for projecting pictures in either exaggerated or diminished stereoscopic relief is to produce a stereoscopic parallax panoramagram, using a large lens in combination with a concave grooved grating, shadow printing this stereoscopic parallax panoramagram to produce in either exaggerated or diminished relief a pseudoscopic parallax panoramagram, and to project this pseudoscopic parallax panoramagram upon a screen which utilizes the pseudoscopic effects to produce pictures in stereoscopic relief, the degree of relief, exaggerated or diminished, depending upon the manner in which the pseudoscopic parallax panoramagram was shadow printed. Such a system is illustrated by Figs. 5 to 9.

Referring now to Fig. 5, a large diameter lens 2 is positioned to image an object 1 through a large angle of view. The image is projected upon the concave grooved surface 19 of the grating 20. A small short focus photographic lens 8 photographs on the film 21, in reduced size, such as motion picture frame or lantern slide size, the image formed at the grating 20. The image formed on the film 21 is of the stereoscopic parallax panoramagram type as opposed to the pseudoscopic parallax panoramagram type produced by the large lens and opaque line grating of Fig. 1. The grating 20 consists of a sheet of transparent material having a concave cylindrical grooved surface 19 and another sheet of transparent material having a ribbed surface which is laid against the plane surface of the first sheet, the ribs being positioned at right angles to the axes of the concave cylindrical grooves. These ribs cause vertical planar diffusion of the incident light rays. The arrangement shown in Fig. 5 is like that disclosed in the copending application of H. E. Ives, Serial No. 518,334, supra.

The stereoscopic parallax panoramagram film 21 produced in Fig. 5 is shadow printed according to the arrangement shown in Fig. 6 for producing a pseudoscopic parallax panoramagram in exaggerated relief. The method of shadow printing is the same as that described in connection with Fig. 2, except in this case, as shown in Fig. 6, a light sensitive film 22, instead of a ground glass plate, is positioned behind the opaque line grating 26. This film is used because the parallax panoramagram produced on the film 21, shown here on enlarged scale, is already of motion picture frame or lantern slide size and consequently does not have to be rephotographed to reduced size, as was necessary in the arrangement of Fig. 4. Due to the inversion, right for left, of the strip images projected from the stereoscopic parallax panoramagram film 21, the parallax panoramagram image produced on the film 22 is of the pseudoscopic parallax panoramagram type and is in exaggerated relief form due to the opaque line grating 26 being positioned nearer the film 22 than the film 21.

The exaggerated relief pseudoscopic parallax panoramagram film 22 is projected by either of the arrangements shown in Figs. 8 and 9 respectively to produce stereoscopic pictures visible in exaggerated relief. The projection arrangement shown in Fig. 8 is identical with that shown in Fig. 3 except for the viewing screen 20 which replaces the viewing screen 15 of Fig. 3. This viewing screen 20 is identical with the grating 20 of Fig. 5 and the same as the concave cylindrical grooved screen described in the copending application of H. E. Ives, Serial No. 515,659, filed February 14, 1931, supra. When the exaggerated relief pseudoscopic parallax panoramagram film 22 of Fig. 6 is projected upon the concave cylindrical grooved screen 20 of Fig. 8, a plurality of virtual images 32 representing panoramic strips of the pseudoscopic parallax panoramagram film 22 are formed behind the concave grooves of the grooved surface 19. These virtual images are stereoscopically as opposed to pseudoscopically positioned so that observers viewing the front of the screen in the direction of the arrows see pictures in stereoscopic relief. The radii of each concave groove is made such that the viewing angle of the screen 20 is the same as the viewing angle of the large lens 2 of Fig. 5. The pictures visible in stereoscopic relief from the front of the screen 20 appear in exaggerated relief form in accordance with the exaggerated relief type of parallax panoramagram image projected from the film 22.

The same system may be employed with the necessary changes in the shadow printing apparatus, to produce stereoscopic pictures visible in diminished relief. The shadow printing apparatus employed to produce parallax panoramagrams of diminished relief is shown in Fig. 7.

Referring now to Fig. 7 the stereoscopic parallax panoramagram film 21 produced by the apparatus of Fig. 5 is shadow printed through an opaque line grating 23 upon the light sensitive film 27 by means of a line source of light 18. This shadow printing method is the same as that employed in connection with Fig. 4 described above; that is, the panoramic strips on the film 21 are spread out over a larger area on the film 27 than formerly occupied on the film 21. In a subsequent viewing of the film 27, the entire panorama on the film is seen through a larger angle and the relief consequently diminished. The pseudoscopic parallax panoramagram film 27 may be projected by the apparatus illustrated in Fig. 8 in the same manner as described above for the projection of the film 22. When an image of the film 27 is projected upon the screen 20, pictures will be visible from the front of the screen in the direction of the arrows and will appear in stereoscopic diminished relief.

The projection system shown in Fig. 9 may be employed for projecting either the film 22 showing exaggerated relief or the film 27 showing diminished relief. The system shown in Fig. 9 is identical with that of Fig. 8 except for the viewing screen 25 which is a reflecting ridged screen having a plurality of cylindrical shaped elements each with a mirror-like reflecting surface 24. The screen 25 is composed of a plurality of cylindrical rod-shaped elements arranged side by side. The front convex surface 24 of each rod element is covered with an opaque light reflecting material or the rods themselves are made of opaque reflecting material, the surface of which is highly polished to reflect the incident light. The front of each element is ribbed to cause vertical planar diffusion of the incident light rays. The ribs are positioned at right angles to the axes of the elements. Owing to the laws of reflection the angle through which the picture is displayed is twice the angle of the circumference on which the strip images fall. A parallax panoramagram made by viewing the object through an angle of 60° must thus be projected upon strips of these cylinders of only 30° extent. Therefore, each element of the screen 25 consists of only a portion of a circular cylindrical rod, the sides having been cut off. The pseudoscopic parallax panoramagram images projected upon the reflecting surface 24 appear as pictures in stereoscopic relief when viewed from the direction of the arrows. The degree of relief, exaggerated or diminished, depends upon the degree of relief in the parallax panoramagram films 22 and 27. A screen similar to the screen 25 is described in the copending application of H. E. Ives, Serial 515,659 supra.

The term "light sensitive plate" as used in this specification signifies not only a glass plate carrying a light sensitive emulsion but any other suitable type of emulsion carrying element. Likewise the term "film" as used herein, denotes not only the celluloid film of well known kind, but also is intended to cover forms of emulsion carrying material other than such celluloid film.

The size of the elongated elements of screens 15 and 25 and of the concave grooves in screen 20 are greatly exaggerated for the sake of clearness in the drawings. The number and size of these elements are determined by the permissible coarseness of grain in the viewed images. The finer the grain, the greater must be the number and the smaller the size in proportion to the size of the whole image.

The term "stereoscopic parallax panoramagram" as used in this specification signifies a parallax panoramagram which has an orientation of the elemental portions of each panoramic strip such as is obtained by exposing a photographic emulsion through an opaque line grating fixed with respect to the emulsion and slightly separated from it by means of a lens moved around the object; that is, the element of any panoramic strip corresponding to the right-hand aspect of the object is located nearest to the left-hand side of the object as pictured. Such a stereoscopic parallax panoramagram and camera for producing the exposure is described in a paper by H. E. Ives entitled "A Camera for Making Parallax Panoramagrams" published in the Journal of the Optical Society of America for December 1928 beginning at page 435.

The term "pseudoscopic parallax panoramagram" as used in this specification signifies a parallax panoramagram in which the orientation of the strip images is just the reverse of the positioning of these images in the stereoscopic parallax panoramagram; that is, the element of any panoramic strip corresponding to the right-hand aspect of the object is located nearest to the right-hand side of the object as pictured. Such a pseudoscopic parallax panoramagram and means for producing the exposure is described in the two Ives' publications of June and November 1930, supra.

The term "planar diffusion" applies to such diffusion of the rays of an elemental beam of light that the rays which lie in a given plane before diffusion all lie in the same plane after diffusion. The rays of the elemental beam may or may not be parallel to one another before diffusion takes place. They are not parallel, of course, after diffusion.

What is claimed is:

1. In a system for producing pictures in stereoscopic relief, means to produce a parallax panoramagram having a certain degree of relief, means for utilizing said parallax panoramagram to produce another parallax panoramagram having a different degree of relief, and means for viewing said second mentioned parallax panoramagram as a picture visible in stereoscopic relief.

2. In a system for producing pictures in stereoscopic relief, means for producing a parallax panoramagram picture of an object, means for shadow printing said parallax panoramagram picture to produce another parallax panoramagram picture in exaggerated relief, and means for projecting said last mentioned parallax panoramagram picture for viewing in exaggerated stereoscopic relief.

3. In a system for producing pictures in stereoscopic relief, means for producing a parallax panoramagram picture of an object, means for shadow printing said parallax panoramagram picture to produce another parallax panoramagram picture in diminished relief, and means for projecting said last mentioned parallax panoramagram picture for viewing in diminished stereoscopic relief.

4. In a system for producing pictures in stereoscopic relief, means to produce a parallax panoramagram of a certain type and degree of relief from a parallax panoramagram of the opposite type and different degree of relief and means utilizing said certain type parallax panoramagram to produce a picture visible in stereoscopic relief.

5. In a system for producing pictures in stereoscopic relief, means for producing a certain type of parallax panoramagram picture of an object, means for shadow printing said parallax panoramagram picture to produce another parallax panoramagram picture of the opposite type and different degree of relief, and means for projecting said parallax panoramagram of the opposite type for viewing in stereoscopic relief, the degree of relief depending upon the manner in which the parallax panoramagram picture was shadow printed.

6. In a system for producing pictures in stereoscopic relief, means for producing a pseudoscopic parallax panoramagram picture of an object, means for shadow printing said pseudoscopic parallax panoramagram picture to produce a stereoscopic parallax panoramagram picture in exaggerated relief, and means for projecting said stereoscopic parallax panoramagram picture for viewing in exaggerated relief.

7. In a system for producing pictures in stereoscopic relief, means for producing a stereoscopic parallax panoramagram, means for utilizing said stereoscopic parallax panoramagram to produce a pseudoscopic parallax panoramagram in exaggerated relief, and means for projecting said pseudoscopic parallax panoramagram to produce stereoscopic pictures in exaggerated relief.

8. In a system for producing pictures in stereoscopic relief, means for producing a stereoscopic parallax panoramagram, means for utilizing said stereoscopic parallax panoramagram to produce a pseudoscopic parallax panoramagram in diminished relief, and means for projecting said pseudoscopic parallax panoramagram to produce stereoscopic pictures in diminished relief.

9. In a system for producing pictures in stereoscopic relief, means for producing a stereoscopic parallax panoramagram, means for shadow printing said stereoscopic parallax panoramagram to produce a pseudoscopic parallax panoramagram in exaggerated relief, and means for projecting said pseudoscopic parallax panoramagram to produce stereoscopic pictures visible in exaggerated relief.

10. In a system for producing pictures in stereoscopic relief, means to produce a stereoscopic parallax panoramagram, means for shadow printing said stereoscopic parallax panoramagram to produce a pseudoscopic parallax panoramagram in diminished relief, and means for projecting said pseudoscopic parallax panoramagram to produce stereoscopic pictures visible in diminished relief.

11. In a system for producing pictures in stereoscopic relief, means to produce a pseudoscopic parallax panoramagram having a certain degree of relief, means to utilize said pseudoscopic parallax panoramagram to produce a stereoscopic parallax panoramagram having a different degree of relief, a viewing screen, and means to project said stereoscopic parallax panoramagram upon said viewing screen to produce stereoscopic pictures visible in said different degree of relief.

12. In a system for producing pictures in stereoscopic relief, means for producing a pseudoscopic parallax panoramagram, means for utilizing said pseudoscopic parallax panoramagram to produce a stereoscopic parallax panoramagram in exaggerated relief, means for projecting said stereoscopic parallax panoramagram to produce stereoscopic pictures visible in exaggerated relief.

13. In a system for producing pictures in stereoscopic relief, means for producing a pseudoscopic parallax panoramagram, means for utilizing said pseudoscopic parallax panoramagram to produce a stereoscopic parallax panoramagram in diminished relief, means for projecting said stereoscopic parallax panoramagram to produce stereoscopic pictures visible in diminished relief.

14. In a system for producing pictures in stereoscopic relief, means for producing a pseudoscopic parallax panoramagram, means for shadow printing said pseudoscopic parallax panoramagram to produce a stereoscopic parallax panoramagram in diminished relief, and means for projecting said stereoscopic parallax panoramagram to produce stereoscopic pictures visible in diminished relief.

15. In a system for producing pictures in stereoscopic relief, means for photographing a parallax panoramagram image of an object through a certain angle of view, means for shadow printing said parallax panoramagram image to produce another parallax panoramagram image of different relief, means for projecting said parallax panoramagram image of different relief, and means for viewing said projected parallax panoramagram image through an angle of view equal to said photographing angle of view.

16. Apparatus for producing pictures in stereoscopic relief, comprising a large lens, an opaque line grating, and a light sensitive plate arranged to form a pseudoscopic parallax panoramagram image of an object upon said plate, a line source of light positioned at a suitable distance from said pseudoscopic parallax panoramagram, a second opaque line grating, a light diffusion plate on which a stereoscopic parallax panoramagram image is shadowed from said pseudoscopic parallax panoramagram through said opaque line grating, said opaque line grating being positioned close to said light diffusion plate with respect to said pseudoscopic parallax panoramagram, so that said stereoscopic parallax panoramagram is printed on said light diffusion plate in exaggerated relief, an objective lens for photographing said stereoscopic parallax panoramagram upon a light sensitive film, a lenticular screen, and a picture projector for projecting said stereoscopic parallax panoramagram upon said screen for viewing as stereoscopic pictures in exaggerated relief.

17. Apparatus for producing pictures in stereoscopic relief, comprising a large lens, an opaque line grating, and a light sensitive plate arranged to form a pseudoscopic parallax panoramagram image of an object upon said plate, a line source of light positioned at a suitable distance from said pseudoscopic parallax panoramagram, a second opaque line grating, a light diffusion plate on which a stereoscopic parallax panoramagram image is shadowed from said pseudoscopic parallax panoramagram, through said opaque line grating, said opaque line grating being positioned closer to said pseudoscopic parallax panoramagram than to said light diffusion plate so that said stereoscopic parallax panoramagram is formed on said diffusion plate in diminished relief, an objective lens for photographing said stereoscopic parallax panoramagram upon a light sensitive film, a lenticular screen, and a picture projector for projecting said stereoscopic parallax panoramagram upon said screen for viewing as stereoscopic pictures in diminished relief.

18. Apparatus for producing pictures in stereoscopic relief, comprising a large lens, a concave cylindrical grooved grating, a photographic lens and a light sensitive film for producing on said film a reduced size stereoscopic parallax panoramagram image of an object, a line source of light positioned at a suitable distance from said stereoscopic parallax panoramagram film and an opaque line grating arranged to shadow print said stereoscopic parallax panoramagram to form a pseudoscopic parallax panoramagram on a second light sensitive film, a picture projector for projecting images of said pseudoscopic parallax panoramagram film, a lenticular screen for receiving said projected parallax panoramagram images, and means embodied in said screen comprising concave cylindrical grooved elements for presenting said projected parallax panoramagram images as pictures in stereoscopic relief.

19. The method of producing a projected picture visible in stereoscopic relief, which comprises photographing an object to produce a parallax panoramagram having a certain degree of relief, forming from said parallax panoramagram another parallax panoramagram of a different type and having a different degree of relief, the two types differing in that if both are viewed in the same manner to produce pictures visible in relief, the picture produced by one type will be visible in stereoscopic relief of a certain degree while that of the other type will be visible in pseudoscopic relief of a different degree, and projecting the picture of such second parallax panoramagram on a screen of such a kind that the projected picture is visible in stereoscopic relief of said different degree.

20. The method of producing a projected picture visible in stereoscopic relief, which comprises photographing an object to produce a pseudoscopic parallax panoramagram, shadow printing said pseudoscopic parallax panoramagram to produce a stereoscopic parallax panoramagram in exaggerated relief, and projecting the picture of said stereoscopic parallax panoramagram upon a screen of such a kind that the projected picture is visible in exaggerated stereoscopic relief.

21. Apparatus for printing parallax panoramagrams comprising a parallax panoramagram from which a print is to be made, a line source of light positioned transverse to the panoramagram strips of said parallax panoramagram and spaced therefrom, means upon which an image of said panoramic strips is formed positioned on the opposite side of said parallax panoramagram from said source, an opaque line grating so located between said parallax panoramagram and said means that the portion of each panoramic strip imaged on said means occupies a different percentage of the entire parallax panoramagram image than the corresponding portion of the panoramic strip of said parallax panoramagram occupies of the entire said parallax panoramagram, and means to make a print of the image on said means.

22. Apparatus for printing parallax panoramagrams comprising a parallax panoramagram from which a print is to be made, a line source of light positioned transverse to the panoramic strips of said parallax panoramagram and spaced therefrom, means upon which an image of said panoramic strips is formed positioned on the opposite side of said parallax panoramagram from said source, an opaque line grating so located between said parallax panoramagram and said means that the portion of each panoramic strip imaged on said means occupies a different percentage of the entire parallax panoramagram image than the corresponding portion of the panoramic strip of said parallax panoramagram occupies of the entire said parallax panoramagram, and means comprising a lens to form a photograph of the image on said means.

23. Apparatus for printing parallax panoramagrams comprising a parallax panoramagram from which a print is to be made, a line source of light positioned transverse to the panoramic strips of said parallax panoramagram and spaced therefrom, means upon which an image of said panoramic strip is formed positioned on the opposite side of said parallax panoramagram from said source, an opaque line grating located between said parallax panoramagram and said means so close to said panoramagram that the whole of each panoramic strip of said panoramagram is imaged on said means to occupy a less percentage of the entire parallax panoramagram image than the percentage of the entire said parallax panoramagram occupied by the whole of said corresponding panoramic strip.

24. Apparatus for printing parallax panoramagrams comprising a parallax panoramagram from which a print is to be made, a line source of light positioned transverse to the panoramagram strips of said parallax panoramagram and spaced therefrom, means upon which an image of said panoramic strips is formed positioned on the opposite side of said parallax panoramagram from said source, an opaque line grating so located between said parallax panoramagram and said means that the portion of each panoramic strip imaged on said means occupies a larger percentage of the entire parallax panoramagram image than the corresponding portion of the panoramic strip of said parallax panoramagram occupies of the entire said parallax panoramagram, and means to make a print of the image on said means.

25. Apparatus for printing parallax panoramagrams comprising a parallax panoramagram from which a print is to be made, a line source of light positioned transverse to the panoramic strips of said parallax panoramagram and spaced therefrom, means upon which an image of said panoramic strips is formed positioned on the opposite side of said parallax panoramagram from said source, and an opaque line grating located between said parallax panoramagram and said means closer to said means.

26. Apparatus for printing parallax panoramagrams comprising a parallax panoramagram from which a print is to be made, a line source of light positioned transverse to the panoramic strips of said parallax panoramagram and spaced therefrom, means upon which an image of said panoramic strips is formed positioned on the opposite side of said parallax panoramagram from said source, means for forming an image of each panoramic strip on said image receiving means so located between said parallax panoramagram and said image receiving means that the portion of each panoramic strip imaged on said image receiving means occupies a different percentage of the entire parallax panoramagram image than the corresponding portion of the panoramic strip of said parallax panoramagram occupies of the entire said parallax panoramagram, and means to make a print of the image on said means.

In witness whereof, I hereunto subscribe my name this 3d day of August, 1931.

HERBERT E. IVES.